UNITED STATES PATENT OFFICE.

FRITZ BENDER, OF MÜHLHEIM, AND GUSTAV SCHULTZ, OF BERLIN, ASSIGNORS TO A. LEONHARDT & CO., OF MÜHLHEIM, AND THE ACTIENGESELLSCHAFT FÜR ANILIN FABRIKATION, OF BERLIN, GERMANY.

OBTAINING DIAZO COLORS BY MEANS OF DIAMIDO-STILBENE AND DIAMIDO-FLUORENE.

SPECIFICATION forming part of Letters Patent No. 360,792, dated April 5, 1887.

Application filed January 20, 1887. Serial No. 224,892. (No specimens.)

*To all whom it may concern:*

Be it known that we, FRITZ BENDER, a resident of Mühlheim, in the Grand Duchy of Hesse, and GUSTAV SCHULTZ, a resident of Berlin, both in the Empire of Germany, have invented new and useful Improvements in Coloring-Matter, of which the following is a specification.

The present invention relates to a process for the production of azo colors from the paradiamines of stilbene and fluorene.

It is a well-known fact that the azo colors which are produced by the combination of paratetrazo compounds with naphthylamine-sulpho acids, naphthol-sulpho-acids, or phenol-carbo-acids, possess the property of dyeing the vegetable fiber without the use of a mordant.

Hitherto the para-diamines of diphenyle, ditolyle, or disylyle, and a number of derivatives of these bases, have been used for the production of such azo colors.

We have found that diamido-fluorene and diamido-stilbene are also well adapted for the above purpose.

I. *Production of the diamido-stilbene and diamido-fluorene.*—(a) Diamido-stilbene: The principal material for the production of diamido-stilbene is para-nitro-benzyle-chloride. According to the observation of Strakosch, (Ber. VI, 328,) two molecules of para-nitro-benzyle-chloride combine with para-dinitro-stilbene when caustic potash is poured into an alcoholic solution of para-nitro-benzyle-chloride, whereby chlorate of potassium separates at the same time. By the reduction of this nitro compound—for instance, by means of tin and hydrochloric acid—the diamido-stilbene is formed, which crystallizes in needles or small leaves, melting at a temperature of 226–227°. The hydrochlorate and the sulphate of the base are not very soluble in water. The same base is also obtained by reducing with tin and hydrochloric acid the amorphous red compound which is produced by heating para-nitro-toluole with alcohol and caustic soda. It is, therefore, identical with that compound which Klinger (Records of the Deutsche Chemische Gesellschaft, 1883, 945) describes under the name of "diamido - phenyle - tolyle - methan." It can further be obtained by treating the para-nitro-benzylene-bromide in an analogous manner as the para-nitro-benzyle-chloride with caustic soda, and by reducing the nitro compound thus obtained by means of tin and hydrochloric acid.

(b) Diamido-fluorene: Diamido-fluorene is produced according to the process described by G. Schultz, (Ann. 203, 100.) The fluorene $C_{13}H_{10}$ is separated from the other hydrocarbons by fractionated distillation and crystallization of those parts of the coal-tar which boil at a temperature of about 290–330°. By acting upon it with concentrated nitrous acid it is converted into dinitro-fluorene, which, by reduction, yields the diamido-fluorene, melting at a temperature of 157°.

II. *Production of colors from diamido-stilbene and diamido-fluorene.*—The production of azo colors from the two diamido compounds of stilbene and fluorene takes place by first converting one of these bases into its tetrazo compound by means of nitrous acid and by combining afterward the tetrazo compound with an amine, a phenol, or one of their sulphonates or carbonates. The reaction takes place always in such manner that the tetrazo compound combines first with one molecule of the amine or the phenol with an intermediate product, which acts afterward upon a second molecule. This property can, therefore, be taken advantage of for the production of the so-called mixed azo colors by combining two different molecules of an amine or a phenol with one molecule of the tetrazo compound.

EXAMPLES.

The following combinations of the tetrazo compounds of stilbene and fluorene with amines and phenols may serve as examples for the process described above.

1. *Color from diamido-stilbene and alpha-naphthol-mono-sulpho-acid.*—28.3 kilograms of hydrochlorate of diamido-stilbene are dissolved in five thousand liters of water mixed with twenty-four kilograms of hydrochloric acid of 20° Baumé and converted into its tetrazo compound by pouring into the above mixture 13.8 kilograms of nitrite of sodium dissolved in two hundred liters of water. The tetrazo compound is then poured, under vigorous stirring, into an alkaline solution of 49.2 kilograms of alpha-naphthol-mono-sulphonate of soda in five thousand liters of water. After one day's standing the mixture is heated up to boiling and the color precipitated by salt, pressed, and dried. It dyes cotton direct from a soap-bath a bluish violet shade.

2. *Color from diamido-stilbene and beta-naphthol-disulpho-acid R.*—If, instead of the quantity of alpha-naphthol-mono-sulphonate of soda stated in example 1, 69.6 kilograms of beta-naphthol-disulphonate of soda (R salt) are used a color is obtained which dyes cotton from an alkaline soap-bath a greenish-blue shade.

3. *Color from one molecule of diamido-stilbene, one molecule of beta-naphthol-disulpho-acid R, and one molecule of naphthol-monosulpho-acid.*—If the above-mentioned tetrazo compound (one molecule) from 28.3 kilograms of hydrochlorate of diamido stilbene acts first upon a solution of 34.8 kilograms of beta-naphthol disulphonate of sodium a red precipitate separates, which is formed by the combination of equal molecules of tetrazo-stilbene and beta-naphthol-di-sulpho-acid. This compound contains a free diazo-group, which enables it to act upon a second molecule of a phenol or an amine. By entering the compound into an alkaline solution of 24.6 kilograms of alpha-naphthol-mono-sulphonate of soda a color is obtained which dyes cotton from a boiling soap-bath a bluish-violet shade, and which stands with regard to shade and solubility between the colors described in examples 1 and 2. The color forms slowly by leaving the mixture standing, quicker by stirring it, and at once by heating it.

4. *Color from one molecule of diamido-stilbene, one molecule of beta-naphthol-disulpho-acid, one molecule of alpha-naphthol, beta-naphthol, or beta-naphthol-mono-sulpho-acid.*—If the quantity of alpha-naphthol-mono-sulphonate of soda stated in example 3 is replaced by 14.3 kilograms of alpha-naphthol, or by 14.3 kilograms of beta-naphthol, or by 24.6 kilograms of beta-naphthol-mono-sulphonate of soda, (salt of Schaeffer's acid,) colors are obtained which dye cotton from an alkaline bath in shades from blue to bluish violet.

5. *Color from diamido-stilbene and salicylic acid.*—A yellow color is obtained by combining the tetrazo-stilbene (from 28.3 kilograms of hydrochlorate) with an alkaline solution of 27.6 kilograms of salicylic acid.

6. *Color from diamido-fluorene and alpha-naphthylamine-sulpho-acid.*—19.6 kilograms of diamido-fluorene are dissolved in two thousand liters of water and 50 kilograms of hydrochloric acid of 20° Baumé, and converted into its tetrazo compound by pouring into the solution 13.8 kilograms of nitrite of sodium dissolved in two hundred liters of water. This tetrazo compound is slowly poured into an alkaline solution of 63.4 kilograms of crystallized alpha-naphthylamine-sulphonate of soda in one thousand liters of water. After about twelve hours' standing two thousand liters of water are added, the mixture heated up to boiling, and the color precipitated by salt, filtered, and dried. The color dyes cotton direct from a boiling soap-bath a red shade.

7. *Color from diamido-fluorene and beta-naphthol-disulpho-acid R.*—A blue azo color is obtained by converting (in the manner described above) 19.6 kilograms of diamido-fluorene into its tetrazo compound and by acting with it upon an alkaline solution of 69.6 kilograms of beta-naphthol-disulphonate of soda, (R salt.) The color dyes cotton direct from an alkaline soap-bath.

By amines are meant aniline, toluidine, xylidine, benzidine, tolidine, beta-naphthylamine, dimethyl-aniline, diethyl-aniline, diphenylamine, phenyl-naphthylamine, and tolylnaphthylamine. By phenols are meant carbolic acid, cresol, resorcin, alpha naphthol, and beta-naphthol.

Having thus described our invention and the manner of employing the same, what we claim, and wish to secure by Letters Patent of the United States of America, is—

The process for the production of azo colors which dye cotton direct from a soap-bath, and which are obtained by combining one molecule of the tetrazo compounds of stilbene or fluorene described above with two equal or different molecules of an amine or a phenol or of a sulphonic or carbonic acid of an amine or a phenol.

In testimony whereof we have signed our names to this specification in the presence of two subscribing witnesses.

FRITZ BENDER.
GUSTAV SCHULTZ.

Witnesses for Fritz Bender:
FRANZ HASSLACHER,
JOSEPH PATRICK.

Witnesses for Gustav Schultz:
B. ROI,
M. W. MOORE.